United States Patent
Burniston et al.

(10) Patent No.: US 9,481,797 B2
(45) Date of Patent: Nov. 1, 2016

(54) PIGMENT FOR PAPER AND PAPER LAMINATE

(75) Inventors: Neil Burniston, Lincs (GB); Robert Burniston, Lincs (GB)

(73) Assignee: Cristal USA Inc., Hunt Valley, MD (US)

( * ) Notice: Subject to any disclaimer, the term of this patent is extended or adjusted under 35 U.S.C. 154(b) by 0 days.

(21) Appl. No.: 13/206,214

(22) Filed: Aug. 9, 2011

(65) Prior Publication Data
US 2013/0040130 A1  Feb. 14, 2013

(51) Int. Cl.
| | |
|---|---|
| *B32B 5/16* | (2006.01) |
| *B32B 29/00* | (2006.01) |
| *C08K 3/22* | (2006.01) |
| *C09C 1/36* | (2006.01) |
| *C09C 1/40* | (2006.01) |
| *C09C 3/00* | (2006.01) |
| *C09C 3/06* | (2006.01) |
| *C09C 3/12* | (2006.01) |
| *C09C 1/00* | (2006.01) |
| *C09C 1/24* | (2006.01) |
| *C09C 1/34* | (2006.01) |
| *D21H 17/67* | (2006.01) |
| *D21H 17/69* | (2006.01) |
| *D21H 19/38* | (2006.01) |
| *D21H 21/52* | (2006.01) |

(52) U.S. Cl.
CPC .......... *C09C 1/3661* (2013.01); *C09C 1/0081* (2013.01); *C09C 1/0084* (2013.01); *C09C 1/0087* (2013.01); *C09C 1/24* (2013.01); *C09C 1/343* (2013.01); *C09C 1/3684* (2013.01); *C09C 1/3692* (2013.01); *C09C 1/407* (2013.01); *C09C 3/006* (2013.01); *C09C 3/063* (2013.01); *C09C 3/12* (2013.01); *D21H 17/67* (2013.01); *D21H 17/69* (2013.01); *D21H 19/38* (2013.01); *D21H 21/52* (2013.01); *C01P 2004/62* (2013.01); *C01P 2004/80* (2013.01); *Y10T 428/257* (2015.01)

(58) Field of Classification Search
USPC .............................................. 106/446, 443
See application file for complete search history.

(56) References Cited

U.S. PATENT DOCUMENTS

| | | | | |
|---|---|---|---|---|
| 2,366,400 | A | * | 1/1945 | Harrison ................. 106/482 |
| 2,378,193 | A | * | 6/1945 | Cummins et al. ......... 162/181.5 |

(Continued)

FOREIGN PATENT DOCUMENTS

| | | |
|---|---|---|
| EP | 0948572 | 12/2003 |
| GB | 2 234 990 A | 2/1991 |

(Continued)

OTHER PUBLICATIONS

English Abstract of Kanekiyo et al. (JP 07187747), Jul. 1995.*

(Continued)

*Primary Examiner* — Ronak Patel

(57) ABSTRACT

A pigment mixture comprising (a) pigment particles, (b) colloidal spacer particles dispersed on surfaces of the pigment particles, and (c) carrier particles, wherein the pigment particles with colloidal spacer particles are dispersed on surfaces of the carrier particles. A pigment mixture of titanium dioxide pigment particles having colloidal silica spacer particles on surfaces of the titanium dioxide, the titanium dioxide and colloidal silica attached to surfaces of diatomaceous earth carrier particles, provides improved optical efficiency of the pigment and improved retention in a paper fiber matrix.

15 Claims, 8 Drawing Sheets

(56) References Cited

U.S. PATENT DOCUMENTS

| | | | |
|---|---|---|---|
| 4,132,560 A | 1/1979 | Marquisee et al. | |
| 4,643,801 A | 2/1987 | Johnson | |
| 5,262,006 A * | 11/1993 | Andersson et al. | 162/147 |
| 5,650,002 A | 7/1997 | Bolt | |
| 5,693,133 A * | 12/1997 | Largent | C08K 5/17 |
| | | | 106/284.06 |
| 6,083,997 A | 7/2000 | Begala et al. | |
| 6,143,064 A * | 11/2000 | Virtanen | 106/449 |
| 6,486,216 B1 | 11/2002 | Keiser et al. | |
| 6,576,052 B1 * | 6/2003 | Takahashi et al. | 106/443 |
| 6,623,555 B1 | 9/2003 | Haverinen et al. | |
| 6,783,631 B2 | 8/2004 | Schulz | |
| 6,890,652 B2 | 5/2005 | Schulz | |
| 6,946,557 B2 | 9/2005 | Onishi et al. | |
| 6,962,622 B2 | 11/2005 | Bender et al. | |
| 7,264,672 B1 * | 9/2007 | Trabzuni et al. | 106/443 |
| 7,288,146 B1 | 10/2007 | Nicolai et al. | |
| 7,601,212 B2 | 10/2009 | Sabesan et al. | |
| 7,686,882 B2 | 3/2010 | Hua et al. | |
| 2002/0050228 A1 * | 5/2002 | Towe | 106/422 |
| 2003/0017280 A1 | 1/2003 | Poetsch et al. | |
| 2004/0137254 A1 | 7/2004 | Schulz | |
| 2004/0177789 A1 | 9/2004 | Heider et al. | |
| 2005/0011408 A1 | 1/2005 | Drews-Nicolai et al. | |
| 2005/0204958 A1 | 9/2005 | Kuebelbeck et al. | |
| 2006/0027141 A1 | 2/2006 | Tarng et al. | |
| 2006/0275597 A1 | 12/2006 | Thiele | |
| 2007/0181038 A1 * | 8/2007 | Sabesan et al. | 106/501.1 |
| 2008/0026183 A1 * | 1/2008 | Vanpoulle | A01N 25/12 |
| | | | 428/143 |
| 2008/0035293 A1 * | 2/2008 | Ahlgren et al. | 162/181.7 |
| 2008/0047471 A1 * | 2/2008 | Hua et al. | 106/443 |
| 2008/0241516 A1 * | 10/2008 | Hong | C04B 20/1074 |
| | | | 428/331 |
| 2011/0041726 A1 * | 2/2011 | Robb | C01G 23/0532 |
| | | | 106/31.13 |

FOREIGN PATENT DOCUMENTS

| | | |
|---|---|---|
| JP | 08258400 | 10/1996 |
| WO | WO97/18268 | 5/1997 |
| WO | WO 2007/085445 A2 | 8/2007 |

OTHER PUBLICATIONS

PCT/US2012/050069; International Search Report and Written Opinion; dated Dec. 27, 2012; 6 pages.

Extended European Search Report (PCT/US2012050069) Apr. 21, 2015.

* cited by examiner

SAMPLE 4 - COLLOIDAL SILICA ADDED IN MIDDLE

US 9,481,797 B2

PIGMENT FOR PAPER AND PAPER LAMINATE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of Invention

The inventive concepts disclosed and claimed herein relate generally to a pigment composition for paper laminate and, more particularly, but not by way of limitation, to particulate pigment attached to carrier particles, wherein colloidal spacer particles are present on the pigment particle surface, and process for surface treating particulate pigment, colloidal particles and carrier particles to produce the carrier particles having pigment composition.

2. Background of the Invention

Particulate inorganic pigments are used as opacifiers and colorants in many industries, including the coatings, plastics, and paper industries. In particular, titanium dioxide pigments, generally in the form of finely divided powders, are added to a pigmented paper laminate or décor paper to impart the desired level of opacity.

Paper laminates are well known in the art and are suitable for a number of uses such as table tops, wall panels, floor surfacing and the like. The paper laminates are produced by impregnating paper with a resin(s) and pressing the impregnated papers which are stacked on top of each other. The type of resin and laminate paper are dictated by the end use of the laminate. Decorative paper laminates can be made by using a decorated paper layer as the upper layer. The decorative paper base differs from the usual types of paper in that the pulps used are very white/bright, and the décor paper has a high proportion of pigments and fillers to achieve the desired high opacity.

When making pigmented paper laminate or décor paper using existing commercial products, the manufacturer has two problematic issues. Firstly, a significant amount of the pigment fails to retain within the paper fiber lattice, requiring additional processing steps to recover the pigment. Secondly, the pigment particles become extremely flocculated, thus requiring high levels to impart the desired level of opacity from the paper.

Light scattering, stability, brightness and opacity of a pigment can be limited at high pigment concentrations due to flocculation or to an effect known as crowding. In paper products, one way to keep the pigment particles spaced at an optimum distance is by adding spacer particles. While there has been some research regarding the proper size and shape of spacer particles, there remains a need for improved compositions and methods for making spaced titanium dioxide pigments having minimal flocculation and improved opacity in paper laminates.

Improved retention technologies have typically focused on use of additives to the paper fiber/pigment furnish. There further remains a need for compositions and methods for making spaced titanium dioxide pigments that deliver improved retention when used in paper laminate.

SUMMARY OF THE INVENTION

A pigment mixture is provided comprising (a) pigment particles, (b) colloidal spacer particles dispersed on surfaces of the pigment particles, and (c) carrier particles, wherein the pigment particles with colloidal spacer particles are dispersed on surfaces of the carrier particles. The pigment mixture offers improved optical efficiency and improved retention when used in paper laminate.

In one embodiment the pigment mixture includes titanium dioxide pigment particles, colloidal silica spacer particles, and diatomaceous earth carrier particles having a mean primary particle diameter in the range of from about 2 to about 25 microns (μm), wherein the colloidal spacer particles are dispersed on surfaces of the pigment particles, the pigment and spacer particles have an alumina top coating, and the top-coated pigment with spacer particles are dispersed on surfaces of the carrier particles.

A method of making a pigment mixture includes the following steps. A slurry of $TiO_2$ pigment particles is mixed with colloidal spacer particles in a manner to cause the colloidal spacer particles to disperse onto surfaces of the pigment particles in an amount in the range of from about 0.1% to about 20% based on the weight of pigment particles. A hydrous metal oxide, such as alumina, silica, phosphate and mixtures thereof, is precipitated to form a top coating on surfaces of the $TiO_2$ pigment particles and colloidal spacer particles dispersed thereon. Carrier particles having a mean primary particle diameter in the range of from about 2 to about 25 microns (μm) are added to the top coated $TiO_2$ pigment and colloidal spacer particles in a manner to form a pigment mixture having the pigment and colloidal spacer particles dispersed onto surfaces of the carrier particles in an amount in the range of from about 0.1% to about 20% based on the total weight of pigment, spacer and carrier particles.

In another embodiment, a cellulose-based product includes cellulosic fiber and a pigment mixture including pigment particles, colloidal spacer particles and carrier particles, wherein the colloidal spacer particles are dispersed on surfaces of the pigment particles, and the pigment particles are dispersed on surfaces of the carrier particles. The carrier particles typically have a mean primary particle diameter in the range of from about 2 to about 25 microns (μm).

In yet another embodiment, a cellulose-based product includes cellulosic fiber and a pigment mixture of $TiO_2$ pigment particles, colloidal silica spacer particles and carrier particles. The colloidal silica spacer particles are dispersed on surfaces of the $TiO_2$ pigment particles and the $TiO_2$ pigment and colloidal silica spacer particles have a top coating of alumina. The top coated $TiO_2$ pigment particles with spacer particles are dispersed on surfaces of the carrier particles having a mean primary particle diameter in the range of from about 2 to about 25 microns (μm).

Thus, utilizing (1) the technology known in the art; (2) the above-referenced general description of the presently claimed and disclosed inventive concept(s); and (3) the detailed description of the inventive concepts that follows, the advantages and novelties of the presently claimed and disclosed inventive concept(s) are readily apparent to one of ordinary skill in the art.

DETAILED DESCRIPTION OF THE INVENTION

Figure 1:
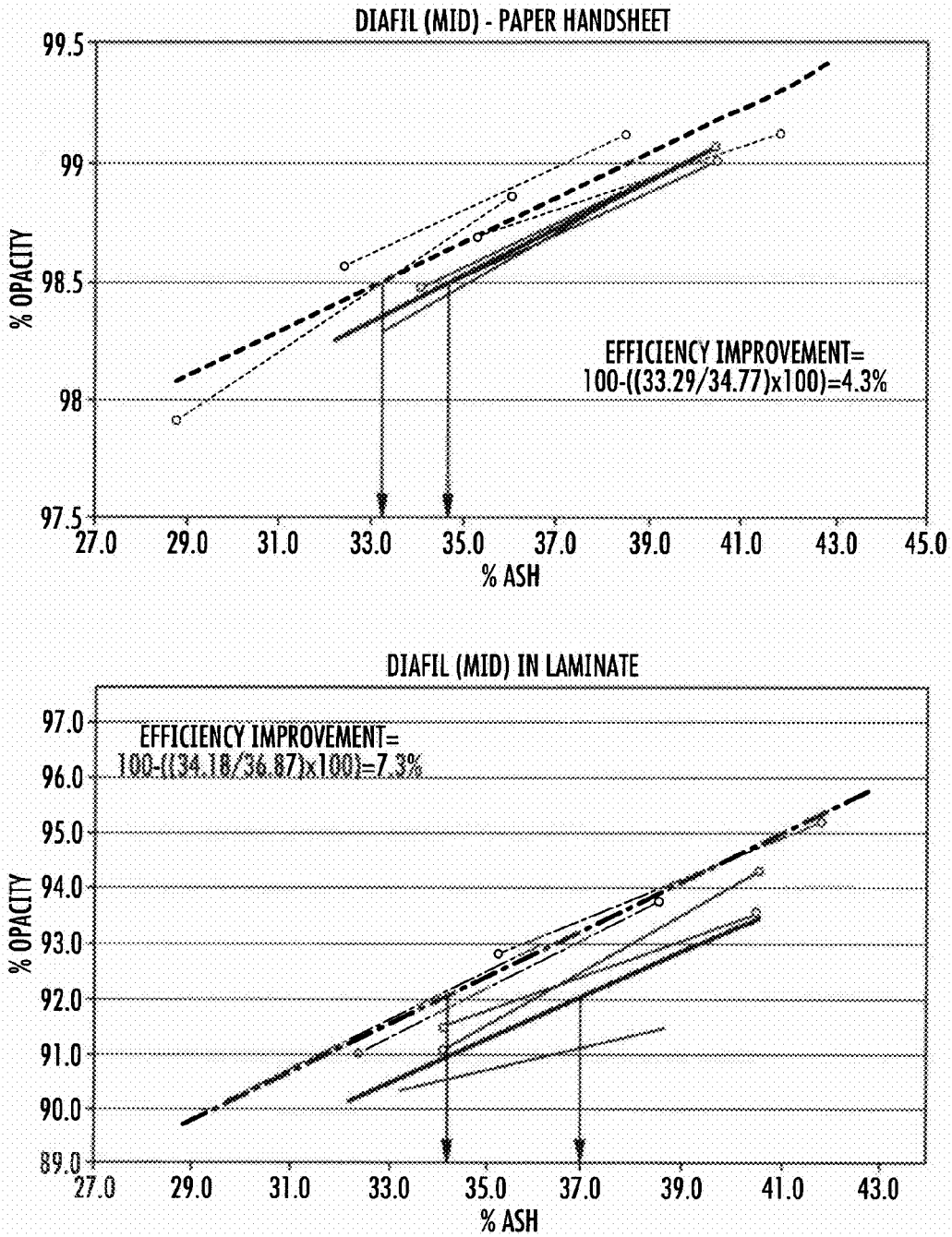
FIG. 1 is a graphical representation of the opacity measurements of Sample 2 of Example 1 in paper handsheet and laminate.
Figure 2:
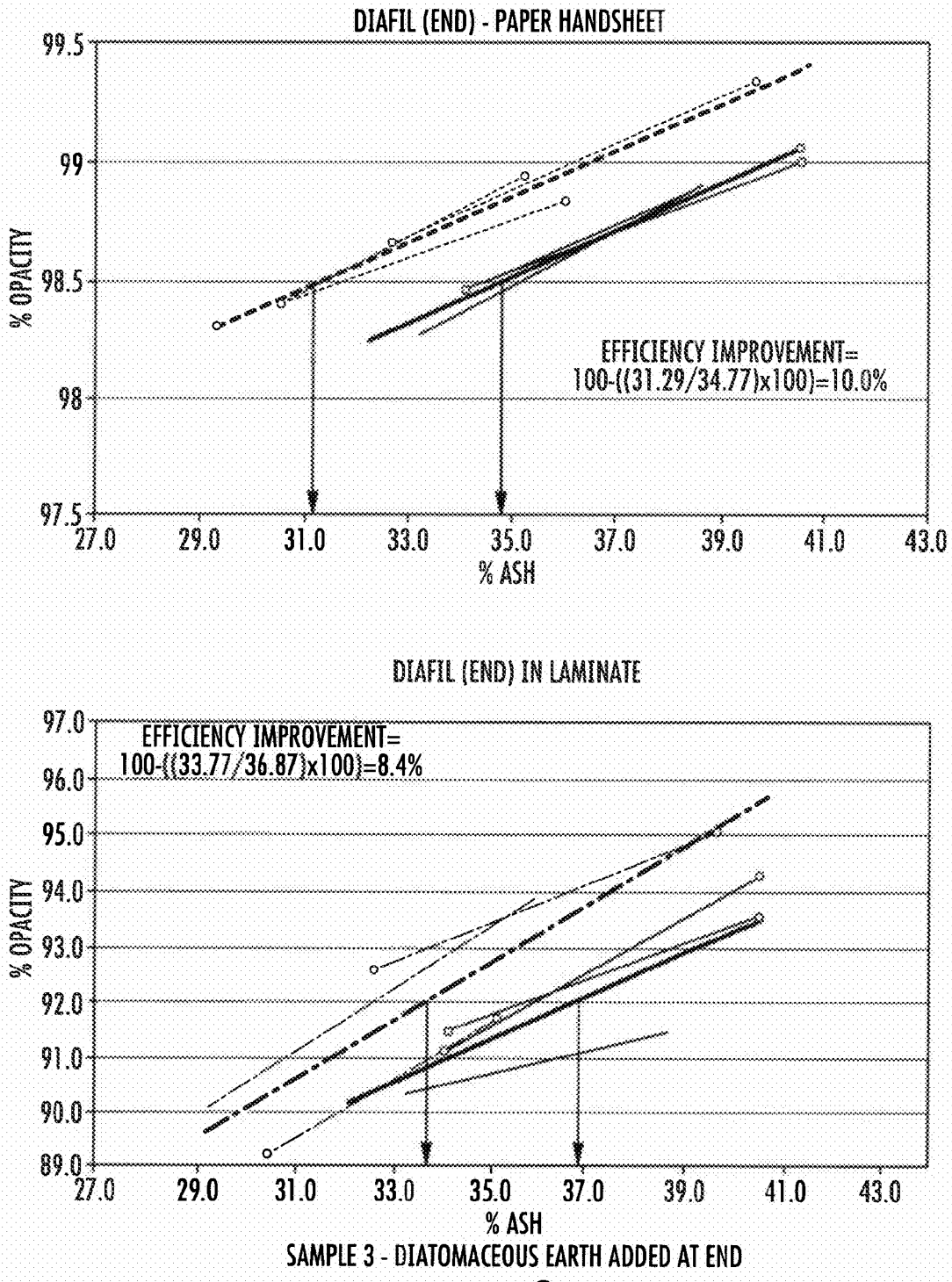
FIG. 2 is a graphical representation of the opacity measurements of Sample 3 of Example 1 in paper handsheet and laminate.
Figure 3:
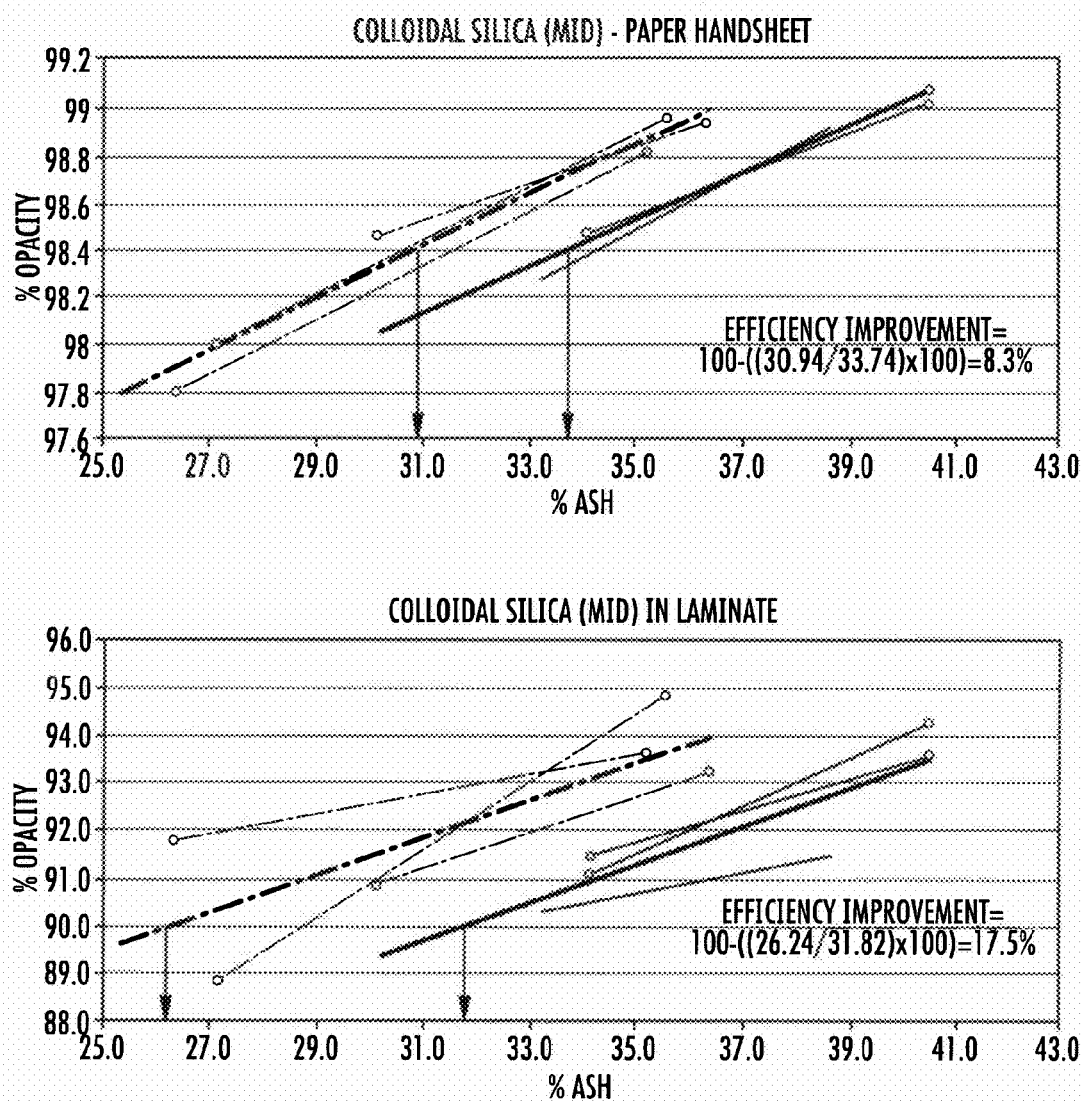
FIG. 3 is a graphical representation of the opacity measurements of Sample 4 of Example 1 in paper handsheet and laminate.
Figure 4:
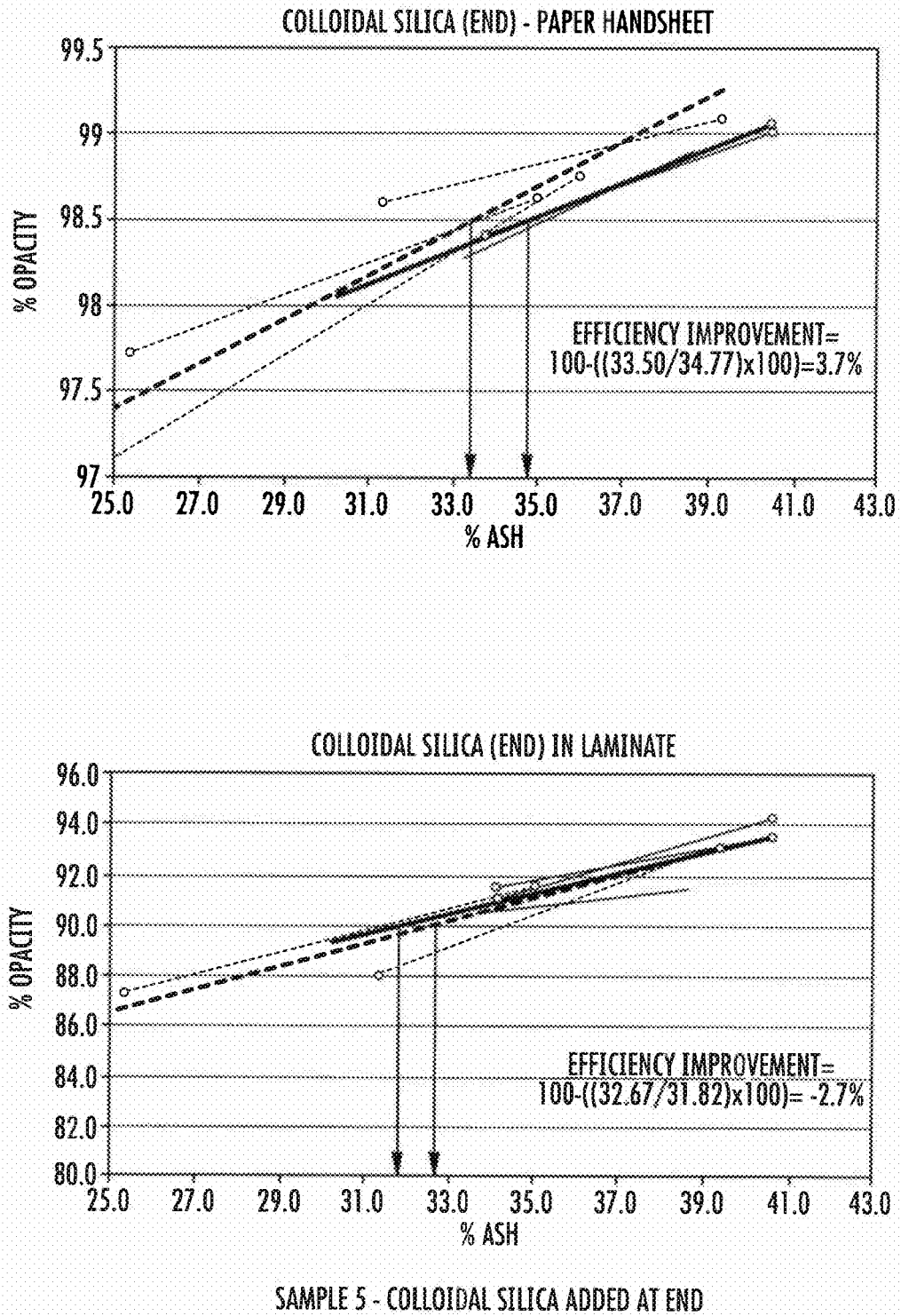
FIG. 4 is a graphical representation of the opacity measurements of Sample 5 of Example 1 in paper handsheet and laminate.

Before explaining at least one embodiment of the presently disclosed and claimed inventive concept(s) in detail, it is to be understood that the presently disclosed and claimed inventive concept(s) is not limited in its application to the details of construction, experiments, exemplary data, and/or the arrangement of the components set forth in the following description or illustrated in the drawings. The presently disclosed and claimed inventive concept(s) is capable of other embodiments or of being practiced or carried out in various ways. Also, it is to be understood that the phraseology and terminology employed herein is for purpose of description and should not be regarded as limiting.

There is a need for new particulate pigment coating technologies having the capability of providing increased retention within a paper fiber lattice as well as improved optical efficiency in paper, but in a cost-effective manner. As mentioned above, a variety of methods have been studied for preparing such pigment compositions, but they typically present a compromise between effectiveness, cost and performance properties in the paper laminate. Surprisingly, it has been discovered that a pigment mixture having spaced pigment particles attached to larger carrier particles, can synergistically provide both improved retention and improved optical properties in the paper. Such a pigment mixture is obtained with a mixture of pigment particles, colloidal spacer particles and carrier particles, wherein the colloidal spacer particles are dispersed on the surfaces of the pigment particles, and the resulting spaced pigment particles are dispersed on the surfaces of the carrier particles.

Previous spacing technology attempted commercially has usually focused on use of additives in the fiber/paper furnish. U.S. Pat. No. 5,650,002 discloses coating particulate pigment surfaces with smaller inorganic particles, resulting in improved scattering efficiency at high pigment volume concentrations. However, there has been no known effort to coat pigment particles onto larger "carrier particles" in order to better embed the pigment particles within a paper fiber matrix, and certainly no attempt to combine the spacer particle surface coating technology with a carrier particle surface coating technology that provides synergistic improvements in both optical properties and fiber retention.

Examples of suitable base particulate for forming the pigment particles of the present disclosure include, but are not limited to, titanium dioxide, zinc sulfide, zinc oxide, iron oxide, lead oxide, aluminum oxide, silicon dioxide, zirconium oxide, and chromium oxide. In one embodiment, the base particulate comprises titanium dioxide such as the rutile form made by the vapor phase oxidation of titanium tetrachloride and commonly referred to as the "chloride process." Additionally, an anatase form of titanium dioxide and/or sulfate process titanium dioxide can be used.

For particulate inorganic pigments, the average particle size ranges from about 0.1 microns to about 0.5 microns. For use in typical pigmentary applications, titanium dioxide typically has a mean primary particle size in the range of from about 0.15 μm to about 0.35 μm (hereinafter referred to as "pigmentary particle size range"). Often, pigmentary titanium dioxide has a particle size in the range of from about 0.2 μm to about 0.35 μm. When the base particulate shape is roughly spherical, the particle size measurements represent the particle diameter. When the particulate inorganic solid shape is acicular or nonspherical, then these measurements represent the measurement of the longest dimension.

The base particulate often includes a surface treatment. When titanium dioxide base particles are used, the base particles are typically treated with a surface treatment material such as aluminum phosphate, aluminum oxide, silicon oxide, zirconium oxide, organo-silane, organo-siloxane and the like. In one embodiment, the pigment particles comprise an inner layer of aluminum phosphate on the surface of the titanium dioxide base particles.

Colloidal spacer particles dispersed on the pigment particle surface can comprise a variety of substances including, but not limited to oxides, hydrated oxides, silicates, carbonates, sulfates, etc. Preferably, the colloidal spacer particle composition should not interfere with or adversely affect the pigment or paper product properties. In certain embodiments, the colloidal spacer particles comprise silica, titania, or zirconia or combinations thereof. For example, a suitable colloidal silica spacer particle is available commercially as Tixosil® 160SL from Rhodia Chimie.

The spacer particles can be present on the particulate pigment over a wide range and depends in large part on the particle size. The colloidal spacer particles should be smaller than the pigment particles and can have an average particle size in a range of from about 5 to about 60 nanometers (nm). Spacer particles are ideally uniformly distributed on the pigment particle surface. The amount of colloidal spacer particles present can vary widely. In some embodiments, the colloidal spacer particles are present in the pigment mixture in an amount of about 0.5 to about 20% based on the weight of pigment particles. In another embodiment, colloidal silica spacer particles are present in the pigment mixture in an amount of about 1 to about 10% based on the weight of pigment particles. The pigment particles with colloidal spacer particles dispersed onto the pigment particle surfaces is sometimes referred to herein and in the appended claims as "spaced pigment particles."

The colloidal spacer particles are electrostatically attracted to the pigment particle surface. However, the colloidal spacer particles can be further bonded to the pigment surface by utilizing a hydrous oxide top coating on the pigment particle wherein the spacer particles are embedded in the top coating. The top coating can be applied before embedding of the spacer particles. Alternatively, the top coating can be applied to the spaced pigment particles, substantially covering both the pigment particles and the colloidal spacer particles dispersed directly onto the pigment particle surfaces. In another embodiment, the top coating is applied over the spaced pigment particles dispersed on the carrier particles, thus covering much of the pigment particles, embedded colloidal spacer particles, and the carrier particle surface.

Examples of suitable hydrous metal oxide top coatings include, alumina, silica and phosphate. An alumina top coating is particularly advantageous for pigment mixtures used in paper because it provides a surface charge which is suitable for interacting with cellulose-based paper fibers. Processes to deposit metal oxides onto pigment particles such as titanium dioxide are well known to those skilled in the art and are suitable for depositing the top coatings.

The resulting "spaced" pigment particles are attracted to and dispersed upon surfaces of carrier particles Examples of suitable carrier particles include, but are not limited to, diatomaceous earth, kaolin, talc, mica, calcium carbonate, china clay and styrene/acrylic copolymer beads. The amount of carrier particles present can vary widely, depending in large part on their size and shape. In some embodiments, the carrier particles are present in the pigment mixture in an amount of about 0.1 to about 20% based on the total weight of solid pigment mixture. In one embodiment the carrier particles are diatomaceous earth and are present in the pigment mixture in a range of from about 0.5% to about 10% based on the total weight of the solid pigment mixture. Suitable diatomaceous earth is available commercially from, for example, Imerys Performance Minerals located in Cornwall, United Kingdom.

The pigment mixtures described herein provide surprisingly improved optical efficiency and improved retention in a fibrous matrix. Improved optical efficiency means that less pigment can be used to achieve the same level of an optical property such as opacity. Without being limited by the exact mechanism at work, it is believed that two main mechanisms are at work. First, the small particles dispersed along particulate pigment surfaces act to space the titanium dioxide particles. This reduces the effect of flocculation and improves light scattering efficiency of the pigment within a paper fiber matrix. The pigment particles can be electrostatically attached to larger (typically 2 to 25 µm) particles of, for example, diatomaceous earth, which acts as a carrier for the pigment particles to more effectively be retained within the paper fiber matrix on production. This means that the first pass retention (of the pigment within the paper) is improved.

In one embodiment, a process for making a pigment mixture as described above utilizes an aqueous slurry of titanium dioxide pigment particles. The titanium dioxide may be untreated titanium dioxide obtained directly from a production process such as the chloride or sulfate processes. Alternatively, the titanium dioxide may be treated with a surface treatment material such as aluminum phosphate, alumina, or silica. Methods for surface treatment of titanium dioxide pigment particles with material such as aluminum phosphate are well known to those skilled in the art.

Spacer particles can be added to the slurry of titanium dioxide by methods that are flexibly and easily incorporated into production processes. For example, there are many places during production of particulate titanium dioxide pigment in which the colloidal spacer particles, hydrous metal oxide top-coating, and carrier particles may be added, and the points of additions described herein are not meant to be exhaustive. The optimal point during which to add the particles and top-coating will, in part, depend on the process in which it is to be incorporated In the simplest of methods, the colloidal spacer particles may be added as a slurry by spraying or pouring the slurry into a system in which the titanium dioxide is already present. To maximize the uniformity of the distribution of the colloidal spacer particles, preferably, a mixing device can be used to mix or to stir the spacer particles and the titanium dioxide. Such mixing devices now known, or that come to be known to those skilled in the art may be used.

Precipitation of a hydrous metal oxide top-coating onto the surfaces of the pigment particles and colloidal spacer particles can be accomplished in much the same manner as when applied to pigment particles without the colloidal material. Processes to deposit hydrous metal oxides onto titanium dioxide are well known to those skilled in the art. Preferably, the metal oxides are added by wet treatment.

The methods for adding the carrier particles may also be similar to methods for adding other surface treatments and can easily be incorporated into production processes such as titanium dioxide production processes. The carrier particles may be added into a system in which the top-coated titanium dioxide and spacer particles are already present. As with addition of the spacer particles, a mixing device may be used to mix or to stir the resulting pigment mixture. Stirred tanks, blenders, or other suitable mixing devices now known, or that come to be known to those skilled in the art may be used.

One possible mixing device is a micronizer. Either the spacer particles or the carrier particles may be metered into a micronizer or jet pulverizer along with the titanium dioxide powder to be ground. Air or steam micronization techniques may be used at temperatures from room temperature up to 250° C. or higher.

In a conventional production process, the colloidal spacer particles and/or carrier particles may, by way of further example, be added separately to a spray dryer feed or repulped filter cake, to a high intensity milling device, to a micronizer feed prior to, or concurrent with micronization. If a sand mill is utilized to correct particle size, the colloidal spacer particles and/or hydrous metal oxide may be added to, for example, the sand mill discharge. Upon drying, the colloidal spacer particles and/or hydrous metal oxide may form a top-coated colloidal particle coating on the $TiO_2$ particle surfaces. In some embodiments, it is desirable to add the colloidal spacer particles and/or hydrous metal oxide after any filtration and washing stages, but prior to any drying stage. In such cases, it may be desirable to add the colloidal spacer particles and/or hydrous metal oxide to a fluidized, washed filter cake with agitation in order to assure uniform mixing.

If the carrier particles are added to a dry titanium dioxide such as a spray dryer product or micronizer feed or product, particular care should be taken to ensure uniform mixing of the carrier particles with the titanium dioxide powder. This may, for example, be accomplished by using a V-shell blender or by using other suitable mixing devices. Carrier particles may be combined with $TiO_2$ in stages, for example, to two or three process points.

To form a paper sheet, the above-described pigment mixture is mixed with cellulosic fiber, such as a refined wood pulp, in an aqueous dispersion. The pulp dispersion is then used to form paper by methods well known to those skilled in the art. By comparing measurements of the ash content of paper made using conventional pigment versus paper made using pigment mixtures containing carrier particles, it can be seen that the carrier particles provide a significantly higher retention of pigment. Thus, a higher pigment first-pass retention is achieved. The "first-pass retention" refers to the fraction of titanium dioxide in the papermaking stock that is retained in the sheet.

Paper laminates can be made by conventional methods well known to those skilled in the art. Basically, paper such as brown paper is impregnated with resins and a high-grade print paper or décor paper is overlaid on top.

It has been found, surprisingly and unexpectedly, that the inventive pigment mixtures disclosed herein have improved optical efficiency in paper products. It was further found that the inventive pigment mixtures disclosed herein provide significantly greater retention in a fiber matrix into which they are incorporated.

In order to further illustrate the present invention, the following examples are given. However, it is to be understood that the examples are for illustrative purposes only and are not to be construed as limiting the scope of the invention.

EXAMPLE 1

Pigment mixtures were made based on an existing décor paper grade titanium dioxide, Tiona® RCL-722 recipe. For all samples, an inner layer of aluminium phosphate was firstly precipitated onto chloride-process titanium dioxide base. At this point, one of the samples had a 10% level of colloidal silica added. Another sample had a 15% level of diatomaceous earth added. A further layer of alumina was precipitated to all samples.

The samples were then filtered and washed free of salts as per normal titanium dioxide pigment production. At this point one of the samples had a 10% level of colloidal silica added. Another sample had a 15% level of diatomaceous earth added. Colloidal silica is available commercially from, for example, Rhodia. Diatomaceous earth is available commercially as, for example, Diafil® which was used in the presently described tests. The samples were then dewatered, dried in an oven overnight at 110° C. and air micronized.

To summarize, five samples were prepared as follows. Sample 1 was a standard or Comparative Example consisting of a pigment used for décor paper with no colloidal silica and no diatomaceous earth added. For Sample 2, 15% diatomaceous earth added in the middle of treatment. For Sample 3, 15% diatomaceous earth added at the end of treatment. For Sample 4, 10% colloidal silica added in the middle of treatment. For Sample 5, 10% colloidal silica added at the end of treatment.

The samples were made into paper handsheets (in triplicate) and these samples made into laminates. The paper and laminates were tested for opacity. The data was analyzed by taking a mean of each of the triplicate samples, and comparing it to the mean of the triplicate controls. The optical efficiency was calculated by determining how much pigment is needed for each sample to match a given opacity when using the control. For example 10% improvement in efficiency means that 10% less of the sample pigment can be used to achieve the same level of opacity as the control.

A summary of all the results are given in Table 1 below. Graphical analyses of the opacity in paper and are shown in FIGS. 1 through 4. As can be seen, the best results were obtained when colloidal silica was added to the middle of the treatment, and when diatomaceous earth was added at the end.

TABLE 1

Optical Efficiency Test Results

| Sample # | Sample Description | $TiO_2$ Efficiency in Paper | $TiO_2$ Efficiency in Laminate |
|---|---|---|---|
| Example 2 | 15% Diafil ® added in middle of treatment | +4.3% | +7.3% |
| Example 3 | 15% Diafil ® added at end of treatment | +10.0% | +8.4% |
| Example 4 | 10% colloidal silica added in middle of treatment | +8.3% | +17.3% |
| Example 5 | 10% colloidal silica added at end of treatment | +3.7% | −2.7% |
| Comparative Example 1 | — | -0- | -0- |

EXAMPLE 2

A further modified $TiO_2$ pigment, Sample 6, was made as follows. An inner layer of aluminium phosphate was firstly precipitated onto chloride-process titanium dioxide base. At this point the sample had a 5% level of colloidal silica added. A further layer of alumina was precipitated onto the sample. The sample was then filtered and washed free of salts as per normal titanium dioxide pigment production. At this point the sample had a 2.5% level of diatomaceous earth added. The sample was then dewatered, dried in an oven overnight at 110° C. and air micronized.

A Standard Sample of $TiO_2$ pigment used commercially in paper laminate was prepared concurrently for comparison. The samples were made into paper handsheets and the handsheets made into laminates for testing.

Figure 5:
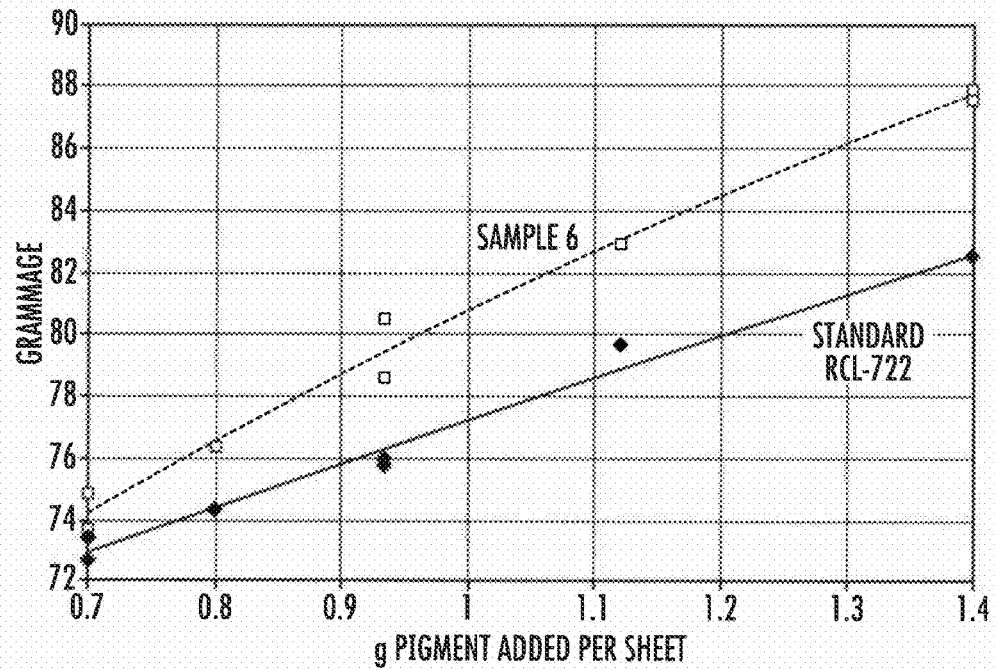
FIG. 5 is a graphical representation of the weight of pigment added per sheet versus the weight of the sheet for both the Standard Sample and Sample 6 of Example 2.

While the paper samples were being prepared, a measure of retention of the pigment onto the paper fibers was made. Each handsheet was prepared with a fixed amount of pigment added. The weight of each sheet was then determined and a comparison of pigment retention of the Sample 6 versus the Standard Sample calculated. In this case an average of 17% less of the sample pigment is required to make a sheet of the same weight as the Standard. FIG. 5 shows a graph of pigment added per sheet versus the weight of the sheet.

Figure 6:
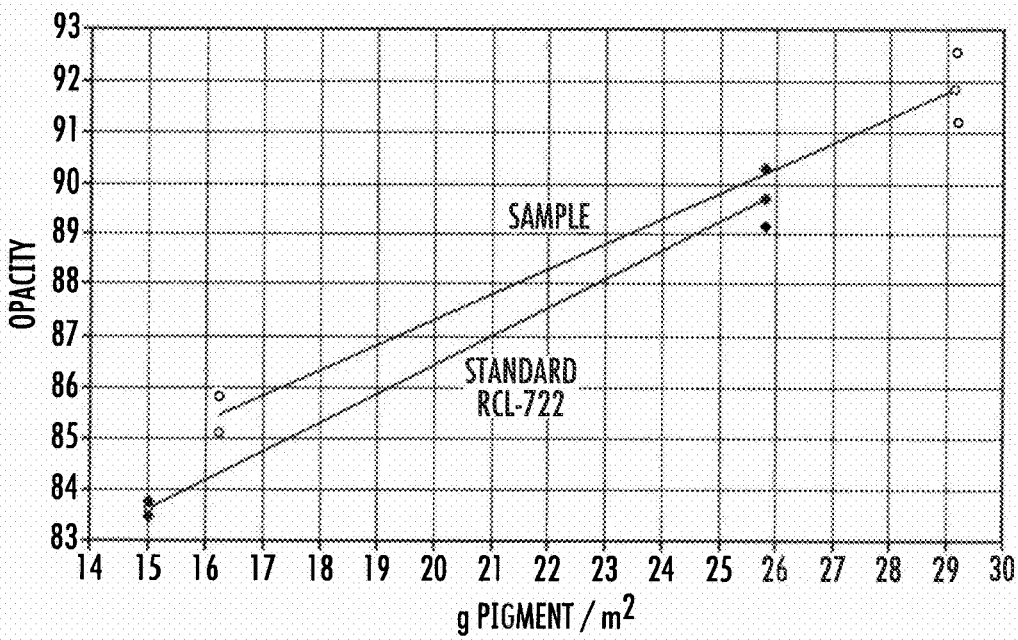
FIG. 6 is a graphical representation of weight of $TiO_2$ added per unit sheet area versus opacity for both the Standard Sample and Sample 6 of Example 2.

The paper handsheets were also made up into laminates and their opacity measured. Again, the optical efficiency is worked out by determining how much pigment is needed for each sample to match a given opacity when using the control. In this case (see graph in FIG. 6) an average of 7% less of the sample pigment is required to match the opacity of the laminate with the standard pigment in.

Figure 7:
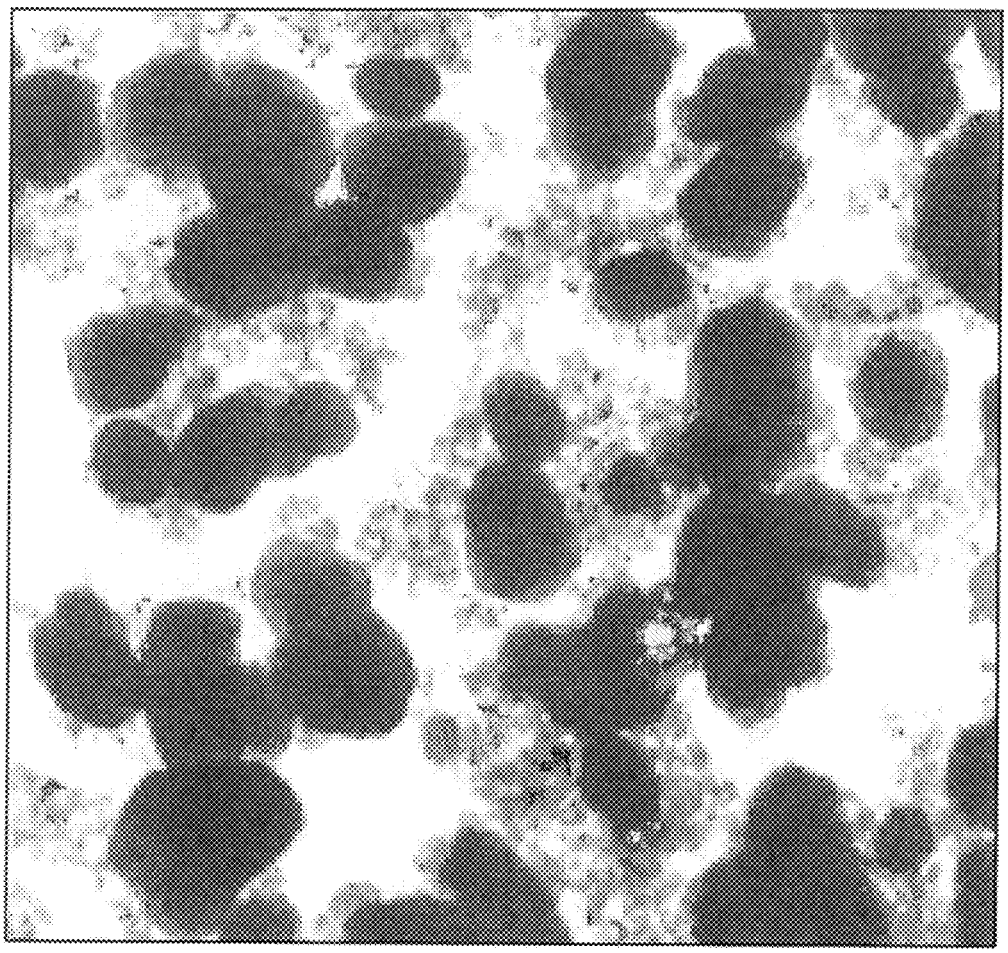
FIG. 7 is an example micrograph of titanium dioxide pigment with colloidal silica acting as a "spacer."
Figure 8:
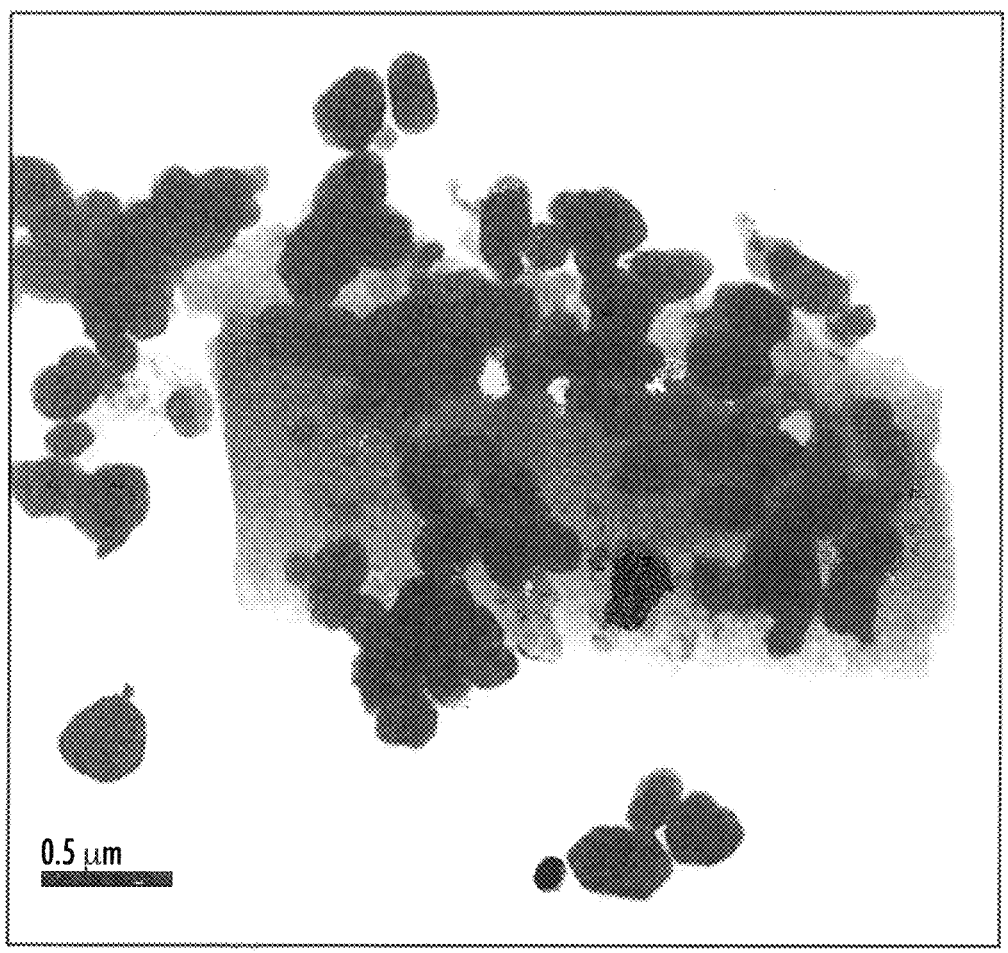
FIG. 8 is an example micrograph of titanium dioxide pigment with diatomaceous earth acting as a "carrier."
Figure 9:
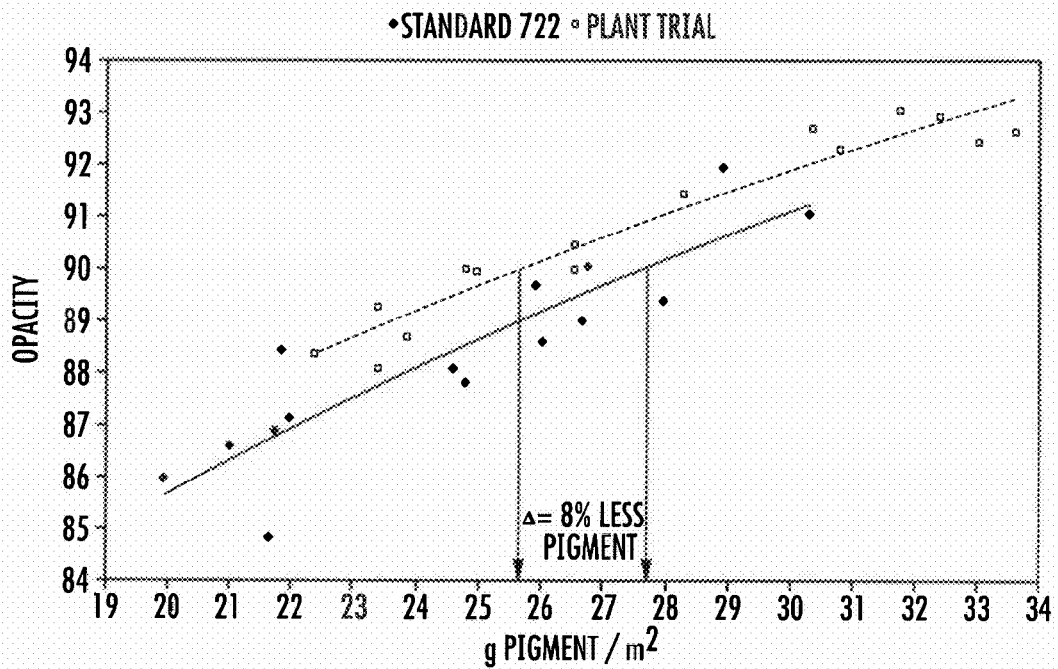
FIG. 9 is a graphical representation of weight of $TiO_2$ added per unit sheet area versus opacity for both a Standard Sample and a plant-trial of an embodiment the present invention.
Figure 10:
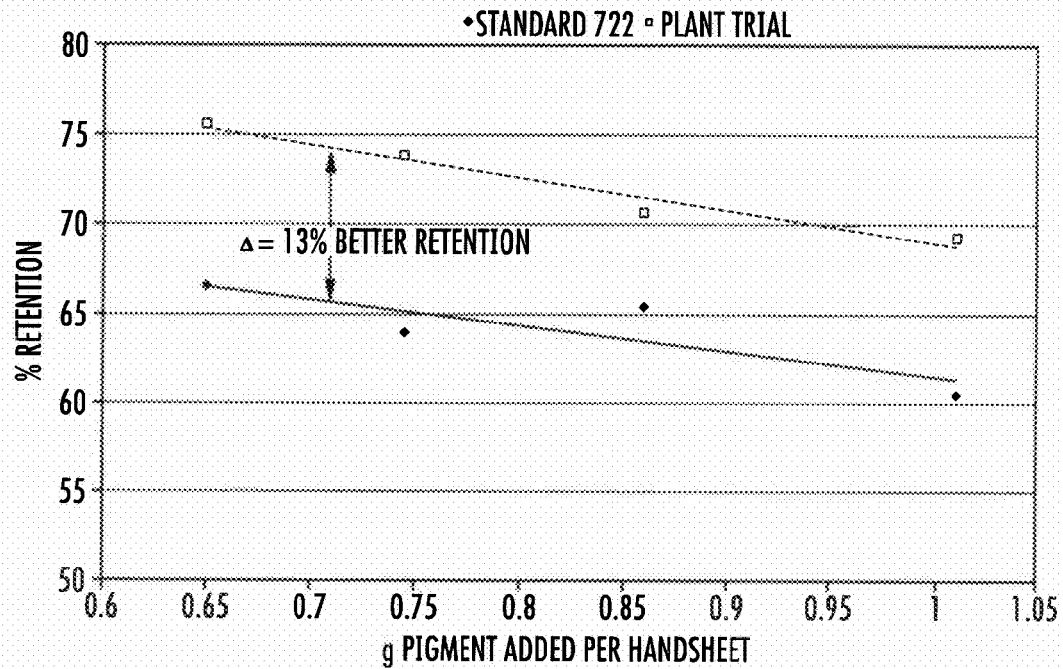
FIG. 10 is a graphical representation of the weight of pigment added per sheet versus the percent pigment retention for both a Standard Sample and a plant-trial of an embodiment the present invention.

FIG. 7 shows a micrograph of $TiO_2$ pigment particles with colloidal silica acting as a spacer. FIG. 8 shows a micrograph of the $TiO_2$ pigment particles with colloidal silica from FIG. 7 combined with diatomaceous earth acting as a carrier. FIGS. 9 and 10 show the increase in opacity and retention achieved in a plant trial utilizing the above-described technology.

In conclusion, it is clear that by modifying the surface treatment of a paper laminate grade pigment particles to include a layer of spacer particles such as colloidal silica in the middle of the inorganic surface treatment and a layer of carrier particles such as diatomaceous earth at the end of treatment provides a pigment mixture which delivers improved retention and optical efficiency.

From the above examples and descriptions, it is clear that the present inventive process(es), methodology(ies), apparatus(es) and composition(s) are well adapted to carry out the objects and to attain the advantages mentioned herein, as well as those inherent in the presently provided disclosure. While presently preferred embodiments of the invention have been described for purposes of this disclosure, it will be understood that numerous changes may be made which will readily suggest themselves to those skilled in the art and which are accomplished within the spirit of the presently claimed and disclosed inventive process(es), methodology(ies), apparatus(es) and composition(s) described herein.

What is claimed is:

1. A pigment mixture comprising (a) pigment particles having a mean primary particle size in the range of from about 0.15 micron (μm) to about 0.5 μm, (b) a hydrous metal oxide top coating on surfaces of the pigment particles, (c) colloidal spacer particles embedded in the top coating on the surfaces of the pigment particles, and (d) diatomaceous earth carrier particles, wherein the coated pigment particles with colloidal spacer particles are attached to surfaces of the diatomaceous earth carrier particles.

2. The pigment mixture of claim 1, wherein the pigment particles comprise a base particulate selected from the group consisting of titanium dioxide, zinc sulfide, zinc oxide, iron oxide, lead oxide, aluminum oxide, zirconium oxide, chromium oxide and mixtures thereof.

3. The pigment mixture of claim 2, wherein the base particulate comprises titanium dioxide.

4. The pigment mixture of claim 3, wherein the pigment particles include an inner layer of treatment material on a surface of the base particulate, the treatment material selected from the group consisting of aluminum phosphate, aluminum oxide, silicon oxide, zirconium oxide, organo-silane, organo-siloxane, and mixtures thereof.

5. The pigment mixture of claim 3, wherein the pigment particles include an inner layer of aluminum phosphate on a surface of the base particulate.

6. The pigment mixture of claim 1, wherein the spacer particles comprise colloidal silica.

7. The pigment mixture of claim 1, wherein the spacer particles have a mean primary particle diameter in the range of from about 5 to about 60 nanometers (nm).

8. The pigment mixture of claim 1, wherein the spacer particles are present in an amount in the range of from about 0.1% to about 20% based on the weight of pigment particles.

9. The pigment mixture of claim 1, wherein the hydrous metal oxide top coating comprises alumina.

10. The pigment mixture of claim 1, wherein the carrier particles have a mean primary particle diameter in the range of from about 2 to about 25 microns (μm).

11. A pigment mixture comprising titanium dioxide pigment particles having a mean primary particle size in a range of from about 0.15 μm to about 0.5 μm, colloidal silica spacer particles, diatomaceous earth carrier particles having a mean primary particle diameter in the range of from about 2 to about 25 microns (μm), and an alumina top coating bonding the colloidal silica spacer particles to the pigment particles, wherein the pigment particles with colloidal spacer particles are combined with the diatomaceous earth carrier particles before the top coating is dried, or the pigment particles with colloidal spacer particles and the diatomaceous earth carrier particles are micronized together, or both, such that the top coated pigment with spacer particles are attached to surfaces of the carrier particles.

12. A cellulose-based product comprising cellulosic fiber and a pigment mixture including pigment particles having a mean primary particle size in a range of from about 0.15 μm to about 0.5 μm, colloidal spacer particles and diatomaceous earth carrier particles, wherein the colloidal spacer particles are dispersed on surfaces of the pigment particles, and the pigment particles are dispersed on surfaces of the carrier particles, the carrier particles having a mean primary particle diameter in the range of from about 2 to about 25 microns (μm), the pigment mixture further comprising a top coating covering surfaces of the carrier particles, dispersed pigment and colloidal spacer particles, the top coating bonding the colloidal silica spacer particles to the pigment particles, the top coated pigment with spacer particles attached to surfaces of the carrier particles.

13. A cellulose-based product comprising cellulosic fiber and a pigment mixture including $TiO_2$ pigment particles having a mean primary particle size in a range of from about 0.15 μm to about 0.5 μm, colloidal silica spacer particles, and diatomaceous earth carrier particles, wherein the colloidal silica spacer particles are dispersed on the surfaces of the $TiO_2$ pigment particles, and the $TiO_2$ pigment particles with spacer particles are dispersed on surfaces of the carrier particles, the carrier particles having a mean primary particle diameter in the range of from about 2 to about 25 microns (μm), the pigment mixture further comprising an alumina-containing top coating covering surfaces of the carrier particles with dispersed pigment and colloidal spacer particles, the top coating bonding the colloidal silica spacer particles to the pigment particles, the top coated pigment with spacer particles attached to surfaces of the carrier particles.

14. The cellulose-based product of claim 13, wherein the product is a décor paper and the pigment mixture is dispersed within the décor paper.

15. The cellulose-based product of claim 13, wherein the product is a paper laminate having a plurality of layers and wherein the pigment mixture is dispersed within at least one layer of the paper laminate.

* * * * *